(12) United States Patent
Kamble et al.

(10) Patent No.: US 9,736,163 B2
(45) Date of Patent: *Aug. 15, 2017

(54) SCALABLE VIRTUAL APPLIANCE CLOUD (SVAC) AND METHODS USABLE IN AN SVAC

(71) Applicant: International Business Machines Corporation, Armonk, NY (US)

(72) Inventors: Keshav G. Kamble, Fremont, CA (US); Dar-Ren Leu, San Jose, CA (US); Nilanjan Mukherjee, Santa Clara, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 14/668,874

(22) Filed: Mar. 25, 2015

(65) Prior Publication Data
US 2015/0200951 A1    Jul. 16, 2015

Related U.S. Application Data

(63) Continuation of application No. 13/484,216, filed on May 30, 2012, now Pat. No. 9,009,831, which is a (Continued)

(51) Int. Cl.
*H04L 29/06* (2006.01)
*G06F 9/455* (2006.01)
(Continued)

(52) U.S. Cl.
CPC ........ *H04L 63/101* (2013.01); *G06F 9/45558* (2013.01); *H04L 45/64* (2013.01); *H04L 47/125* (2013.01)

(58) Field of Classification Search
CPC ..... H04L 63/1408; H04L 45/00; H04L 12/64; H04L 2012/562; H04L 2012/5621;
(Continued)

(56) References Cited

U.S. PATENT DOCUMENTS 7,193,994 B1    3/2007 Payson
7,209,657 B1    4/2007 Islam
(Continued)

FOREIGN PATENT DOCUMENTS

CN    1783843 A    6/2006
CN    102057631 A    5/2011
(Continued)

OTHER PUBLICATIONS

Rimal et al., "Chapter 2 A Taxonomy, Survey, and Issues of Cloud Computing Ecosystems," Cloud Computing: Principles, Systems and Applications, Computer Communications and Networks, Springer-Verlag London Limited, 2010, pp. 21-46.
(Continued)

*Primary Examiner* — Tae Kim
*Assistant Examiner* — Shiuh-Huei Ku
(74) *Attorney, Agent, or Firm* — Zilka-Kotab, P.C.

(57) ABSTRACT

According to one embodiment, a system includes at least one switching distributed line card (DLC) configured to apply Access Control Lists (ACLs) on each switching interface of the at least one switching DLC to direct certain received packets to at least one appliance DLC to have deep packet inspection services performed on the certain received packets, and at least one central switch fabric coupler (SFC) in communication with the at least one switching DLC, where the at least one appliance DLC and the at least one switching DLC are connected to the at least one central SFC. Other systems, methods and computer program products for
(Continued)

providing scalable virtual appliance cloud (SVAC) services are described in more embodiments.

25 Claims, 11 Drawing Sheets

Related U.S. Application Data continuation of application No. 13/423,107, filed on Mar. 16, 2012, now Pat. No. 8,789,164.

(51) Int. Cl.
*H04L 12/803* (2013.01)
*H04L 12/715* (2013.01)
*H04L 12/64* (2006.01)

(58) Field of Classification Search
CPC ....... H04L 49/25; H04L 51/14; H04L 65/604; G06F 21/55
USPC ............................ 726/23; 370/211, 351, 352
See application file for complete search history.

(56) References Cited

U.S. PATENT DOCUMENTS

| | | | |
|---|---|---|---|
| 7,224,668 B1 | 5/2007 | Smethurst et al. | |
| 7,616,646 B1 | 11/2009 | Ma et al. | |
| 7,894,343 B2 | 2/2011 | Chao et al. | |
| 7,937,483 B2 | 5/2011 | Chen et al. | |
| 7,948,986 B1 | 5/2011 | Ghosh et al. | |
| 8,270,308 B2* | 9/2012 | Su | H04L 12/2697 370/244 |
| 8,345,558 B2* | 1/2013 | Nicholson | H04L 12/26 370/242 |
| 8,789,164 B2 | 7/2014 | Kamble et al. | |
| 9,009,831 B2 | 4/2015 | Kamble et al. | |
| 2003/0123455 A1* | 7/2003 | Zhao | H04L 47/568 370/398 |
| 2004/0179092 A1* | 9/2004 | LaPoint | H04L 29/06 348/14.08 |
| 2005/0002334 A1 | 1/2005 | Chao et al. | |
| 2005/0089054 A1 | 4/2005 | Ciancaglini et al. | |
| 2009/0293056 A1* | 11/2009 | Ferris | G06F 9/5077 718/1 |
| 2009/0300149 A1 | 12/2009 | Ferris et al. | |
| 2010/0332617 A1 | 12/2010 | Goodwin et al. | |
| 2011/0055398 A1 | 3/2011 | Dehaan et al. | |
| 2011/0119364 A1 | 5/2011 | Zarkesh | |
| 2011/0188386 A1 | 8/2011 | Nicholson et al. | |
| 2013/0044757 A1* | 2/2013 | Rai | H04L 47/125 370/395.53 |
| 2013/0242999 A1 | 9/2013 | Kamble et al. | |
| 2013/0247168 A1 | 9/2013 | Kamble et al. | |

FOREIGN PATENT DOCUMENTS

| | | |
|---|---|---|
| GB | 2509473 A | 7/2014 |
| WO | 2009111799 A2 | 9/2009 |
| WO | 2010099514 A2 | 9/2010 |
| WO | 2010127266 A1 | 11/2010 |
| WO | 2011067099 A2 | 6/2011 |
| WO | 2011080063 A1 | 7/2011 |
| WO | 2013136213 A1 | 9/2013 |

OTHER PUBLICATIONS

Sabahi, F., "Virtualization-Level Security in Cloud Computing," IEEE, May 2011, pp. 250-254.
International Search Report and Written Opinion from PCT Application No. PCT/IB2013/051643, dated Aug. 1, 2013.
Non-Final Office Action from U.S. Appl. No. 13/423,107, dated Apr. 12, 2013.
Final Office Action from U.S. Appl. No. 13/423,107, dated Oct. 11, 2013.
Advisory Action from U.S. Appl. No. 13/423,107, dated Jan. 6, 2014.
Notice of Allowance from U.S. Appl. No. 13/423,107, dated Mar. 11, 2014.
European Exam Report from European Application No. GB1415161.7, dated Sep. 19, 2014.
Non-Final Office Action from U.S. Appl. No. 13/484,216, dated Sep. 26, 2013.
Final Office Action from U.S. Appl. No. 13/484,216, dated Apr. 22, 2014.
Advisory Action from U.S. Appl. No. 13/484,216, dated Jun. 27, 2014.
Notice of Allowance from U.S. Appl. No. 13/484,216, dated Dec. 5, 2014.
Kamble et al., U.S. Appl. No. 13/484,216, filed May 30, 2012.
Kamble et al., U.S. Appl. No. 13/423,107, filed Apr. 16, 2012.
Office Action from Chinese Patent Application No. 201380014161.X, dated Jul. 20, 2016.

* cited by examiner

SCALABLE VIRTUAL APPLIANCE CLOUD (SVAC) AND METHODS USABLE IN AN SVAC

BACKGROUND

The present invention relates to data center infrastructure, and more particularly, this invention relates to an appliance cloud for use in a data center.

While the need for elasticity of data center infrastructure has been debated in great length and the industry has already imagined multiple competitive ideas on how to make data centers more agile, there has been less emphasis on virtualizing security, e.g., firewalls, intrusion prevention systems (IPS), intrusion detection systems (IDS), and services, e.g., accelerators, virtual private network (VPN) termination, aspects of cloud ready data centers. Sharing infrastructure across multiple applications and clients is becoming increasingly common with server virtualization and distributed application architecture and recent trends indicate that an exponential increase in server-to-server communications (termed as east-west traffic in data center) as application become more and more distributive is most likely. Furthermore, with overlay network, e.g., virtual extensible local area network (VXLAN), and virtual machine (VM) mobility, it is becoming more difficult to create and manage firewall configurations for securing data centers, e.g., demilitarized zones (DMZs) separated by firewall(s) that allow only certain types of network traffic to enter or leave, within a data center according to traditional approaches.

SUMMARY

In one embodiment, a system includes at least one switching distributed line card (DLC) configured to apply Access Control Lists (ACLs) on each switching interface of the at least one switching DLC to direct certain received packets to at least one appliance DLC to have deep packet inspection services performed on the certain received packets, and at least one central switch fabric coupler (SFC) in communication with the at least one switching DLC, where the at least one appliance DLC and the at least one switching DLC are connected to the at least one central SFC.

In another embodiment, a method includes receiving incoming data traffic including multiple packets directed toward a SVAC using at least one switching DLC, applying ACLs on each switching interface of the at least one switching DLC to direct certain packets to at least one appliance DLC to have deep packet inspection services performed on the certain packets, and performing one or more deep packet inspection services on the certain packets using the appliance DLC.

In yet another embodiment, a computer program product includes a computer readable storage medium having program instructions embodied therewith, the embodied program instructions executable by a switching DLC to cause the switching DLC to receive, by the switching DLC, incoming data traffic including multiple packets directed toward a SVAC, apply, by the switching DLC, ACLs on each switching interface of the switching DLC to direct certain packets to at least one appliance DLC to have deep packet inspection services performed on the certain packets, where the ACLs are configured to trap certain traffic flows to perform similar deep packet inspection services thereon and to designate destination ports to which the certain traffic flows are sent to receive the similar deep packet inspection services, and send, by the switching DLC, the certain packets to an intended destination after one or more deep packet inspection services have been performed on the certain packets using the appliance DLC.

Other aspects and embodiments of the present invention will become apparent from the following detailed description, which, when taken in conjunction with the drawings, illustrate by way of example the principles of the invention.

DETAILED DESCRIPTION

Figure 1:
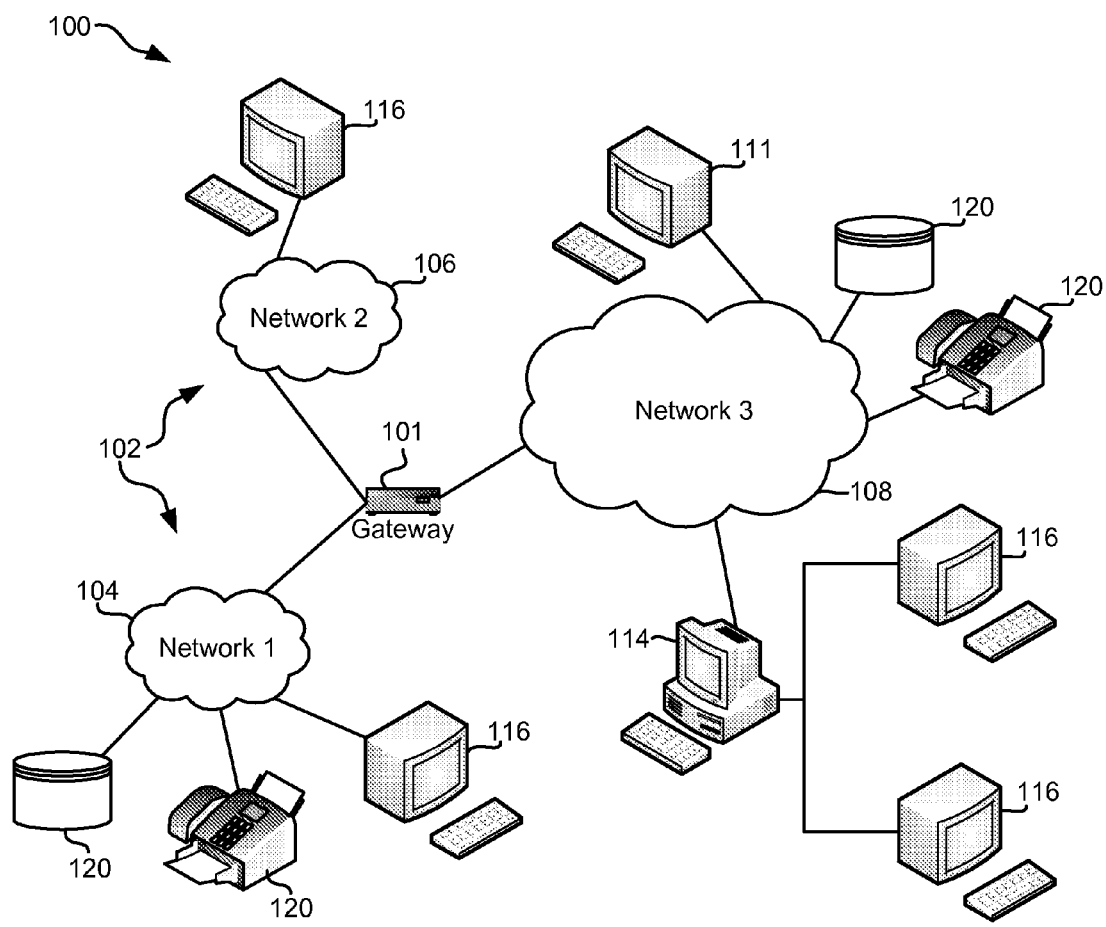
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, a cloud-ready data center may be truly agile when networking appliances and services are virtualizable in a manner which reduces management complexity of data center security and service acceleration.

In one general embodiment, a system includes a scalable virtual appliance cloud (SVAC) including at least one distributed line card (DLC), at least one switch fabric coupler (SFC) in communication with the at least one DLC, and at least one controller in communication with the at least one DLC. One or more of the at least one DLC is an appliance DLC, one or more of the at least one SFC is a central SFC, and the SVAC appears to a device external of the SVAC as a single appliance device applying various services to a traffic flow.

In another general embodiment, a method for providing SVAC services includes receiving incoming data traffic having multiple packets directed toward a SVAC using at least one switching DLC, determining that a packet satisfies a condition of an access control list (ACL), designating a destination port to send the packet based on the condition of the ACL being satisfied, fragmenting the packet into at least one cell, wherein the designated destination port is stored in a cell header of the at least one cell, sending the at least one cell to the destination port via at least one SFC, receiving the at least one cell at a fabric interface of an appliance DLC corresponding to the destination port, reassembling the at least one cell into a second packet, performing one or more services on the second packet using the appliance DLC, and sending the second packet to its intended port.

In yet another general embodiment, a method for providing SVAC services includes receiving a plurality of cells from one or more SFC, wherein one or more services have been requested to be performed on the plurality of cells, reassembling the plurality of cells into one or more packets using a local network switch of an appliance DLC, performing the one or more requested services on the one or more packets using the appliance DLC, fragmenting the one or more packets into cells using the local network switch of the appliance DLC, wherein a packet switching block of the appliance DLC does not learn source or destination addresses from packets received from a local processor of the appliance DLC, and sending the one or more packets to the one or more SFC using the local network switch of the appliance DLC.

According to another general embodiment, a method for providing SVAC services includes receiving a plurality of packets at a switching DLC, wherein one or more services have been requested to be performed on the plurality of packets, analyzing the plurality of packets to determine one or more services to be performed on one or more portions of the plurality of packets using at least one ACL, determining at least one destination port associated with one or more appliance DLC, wherein each of the one or more appliance DLC is adapted for providing the determined one or more services to the one or more packets, fragmenting the one or more packets into a plurality of cells, and sending the plurality of cells to the determined at least one destination port via one or more SFC.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
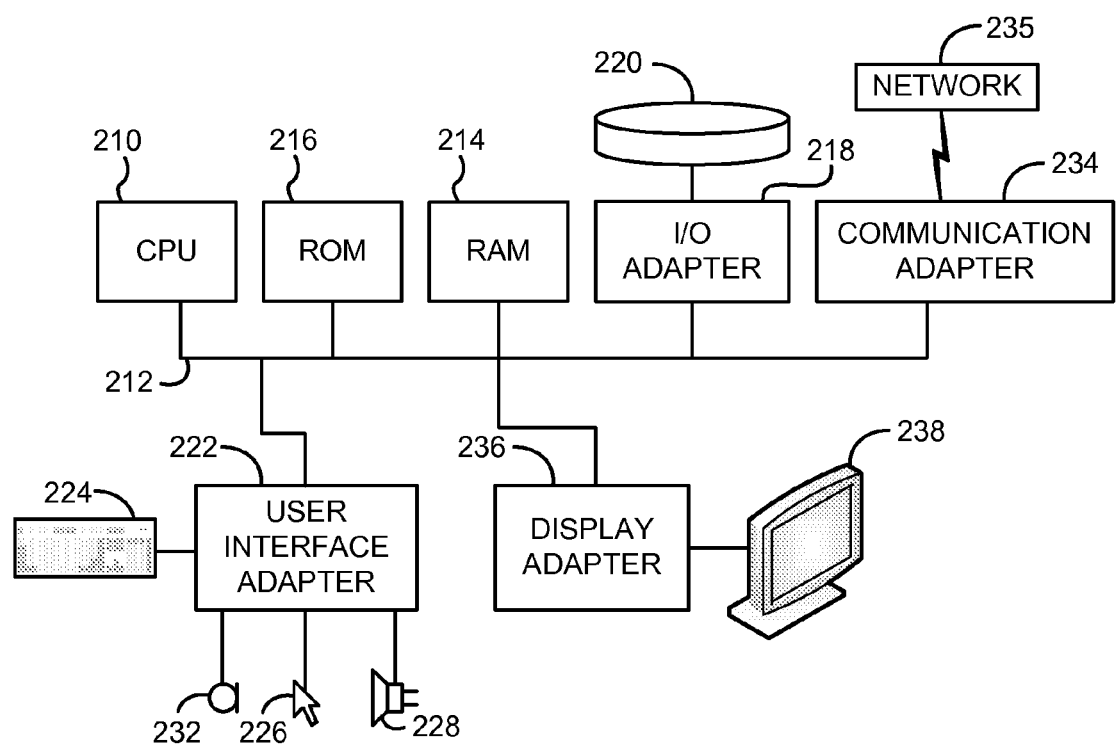
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
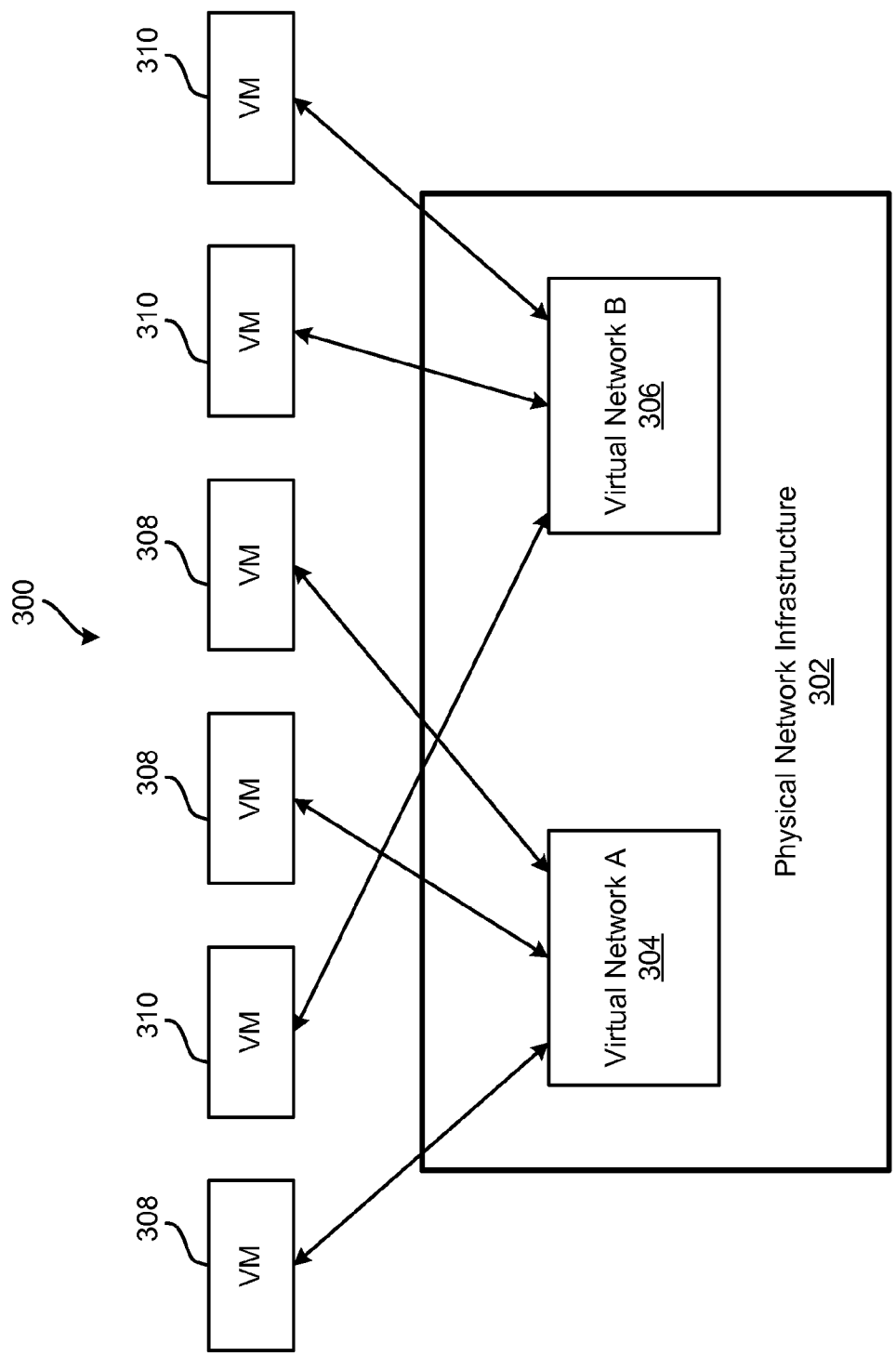
FIG. 3 shows a conceptual view of an overlay network, according to one embodiment.

Referring now to FIG. 3, a conceptual view of an overlay network 300 is shown according to one embodiment. In order to virtualize network services, other than simply providing a fabric path (connectivity) between devices, an appliance cloud may be virtualized. The overlay network 300, in one approach, comprises one or more virtual networks 304, 306 within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art.

Each virtual network 304, 306 may include any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

Figure 4:
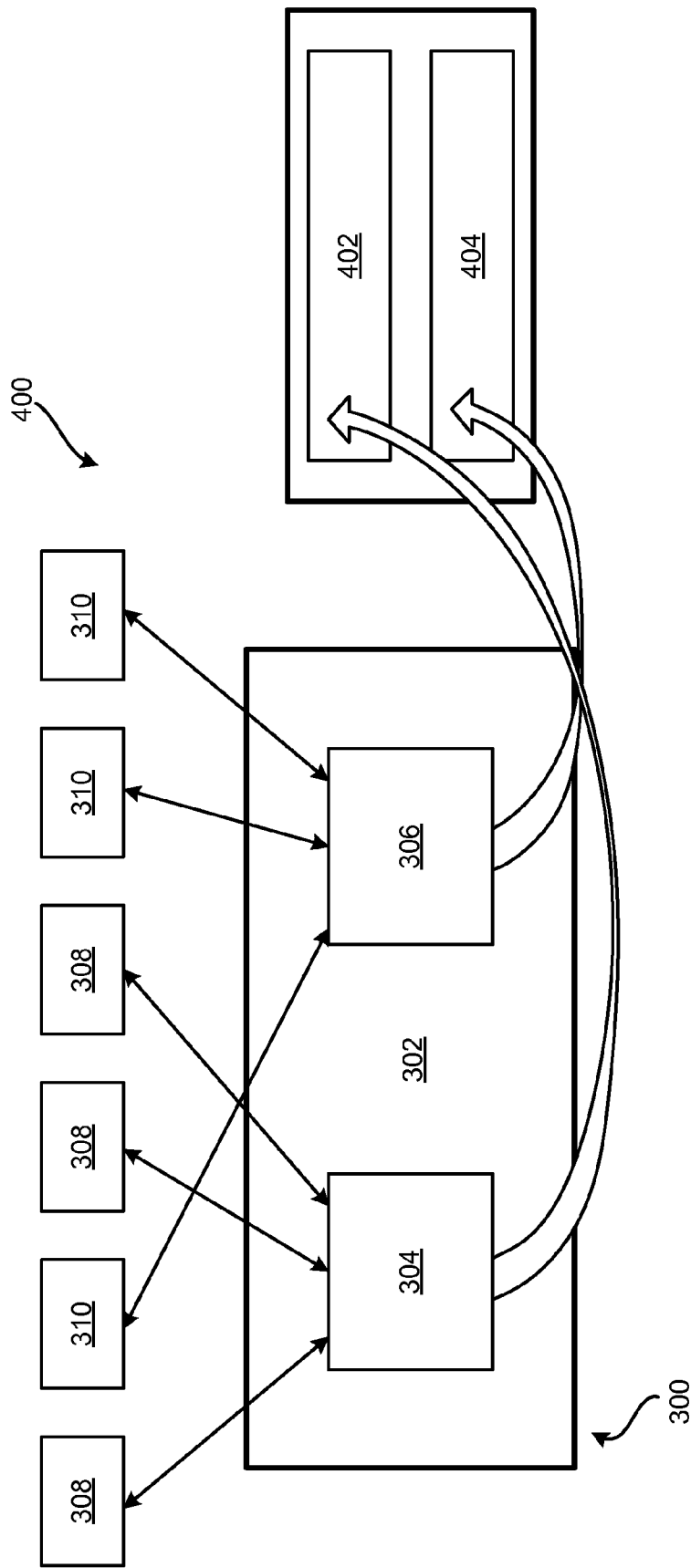
FIG. 4 is a simplified diagram of a virtualized data center with appliances, according to one embodiment.

Now referring to FIG. 4, a conceptual view of a virtualized data center 400 with virtual appliance(s) 402, 404 is shown according to one embodiment. One of the critical features of a cloud-ready data center 400 is high utilization of physical resources within a dynamic service environment providing high availability (HA), great reliability, and good serviceability. In order to provide these features, the data center 400 may be designed so that it may be scaled-out (made larger over time) and so that a software abstraction layer may be provided with multi-tenancy management capability. Of course, other ways of accomplishing the features may be used which closely resemble the above described techniques according to various embodiments, as would be understood by one of skill in the art upon reading the present descriptions.

The hardware infrastructure that supports a virtual appliance cloud, according to one embodiment, allows for a scaled-out solution, e.g., a scaled-out solution rather than a scaled-up solution. In order for this to take place, in one approach, a hardware infrastructure platform has been created where new service hardware may be added to existing infrastructure with minimal overhead such that benefits of incremental capacity building are derived. Such a system, when viewed overall, looks like a single appliance device with multiple serialized services being applied.

Figure 5:
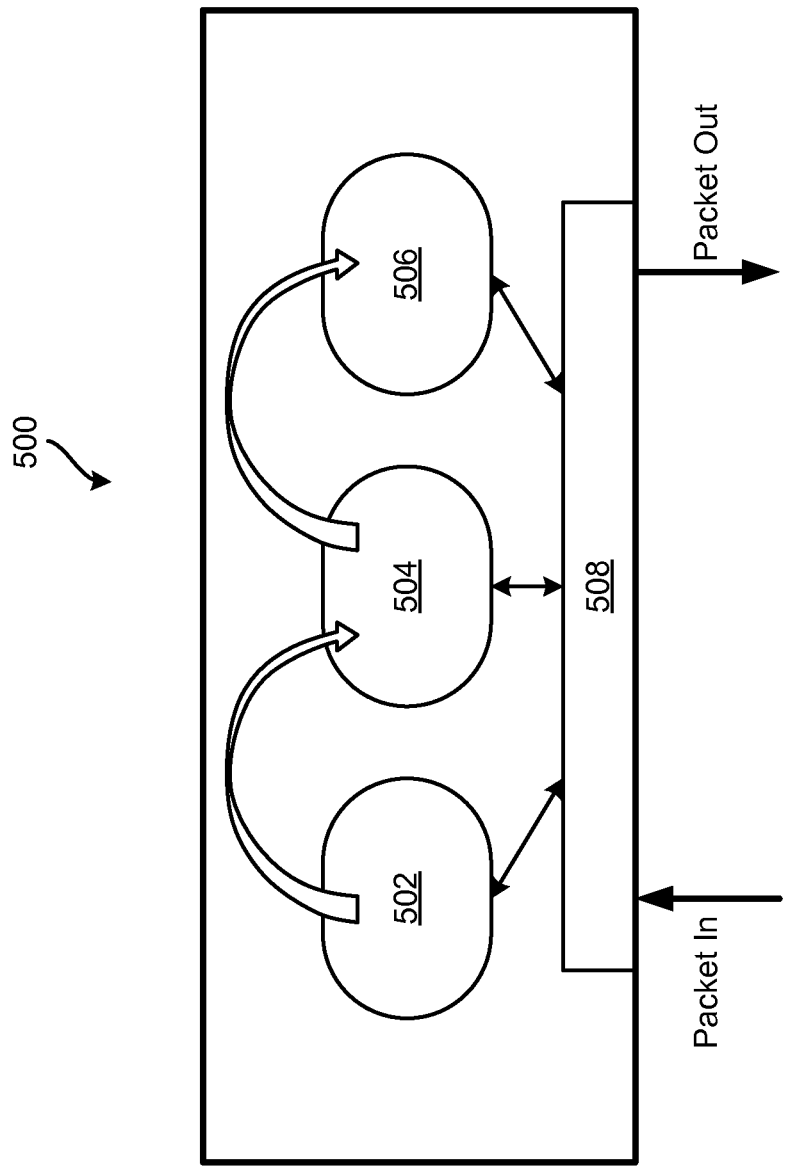
FIG. 5 shows a system, according to one embodiment.

Now referring to FIG. 5, a system 500 is shown according to one embodiment, which comprises firewall services 502, intrusion prevention system (IPS) and intrusion detection system (IDS) 504, and server load balancing services 506. The system 500 includes management logic 508 which controls the above defined services, along with any other running on the system 500, in many approaches. The management logic 508 also handles incoming data packets and outgoing data packets, regardless of the packet transfer protocol, e.g., Ethernet, peripheral component interconnect express (PCIe)-over Ethernet, fibre channel (FC) over Ethernet (FCoE), etc.

In one approach, incoming data packets may be analyzed to determine one or more services that the system 500 may perform in the course of processing the incoming data packets. Moreover, the services that the system may perform defines all or part of a processing pathway that the incoming data packets will traverse in the course of processing the data packets by the scalable virtual appliance cloud.

For example, in one embodiment where certain services are performed only by a subset of appliances, data packets requiring those services must arrive at one of the subset of appliances in order to receive the service of interest. Accordingly, at least part of the processing pathway will include a "stop" at one of the subset of appliances, partially defining the processing pathway, in one embodiment. In more constricted approaches, an entire processing pathway may be defined according to a data packet's servicing requests.

According to one embodiment, the system 500 may be constructed from a cell switched domain scalable fabric component interconnected with appliance distributed line cards (DLCs).

Figure 6:
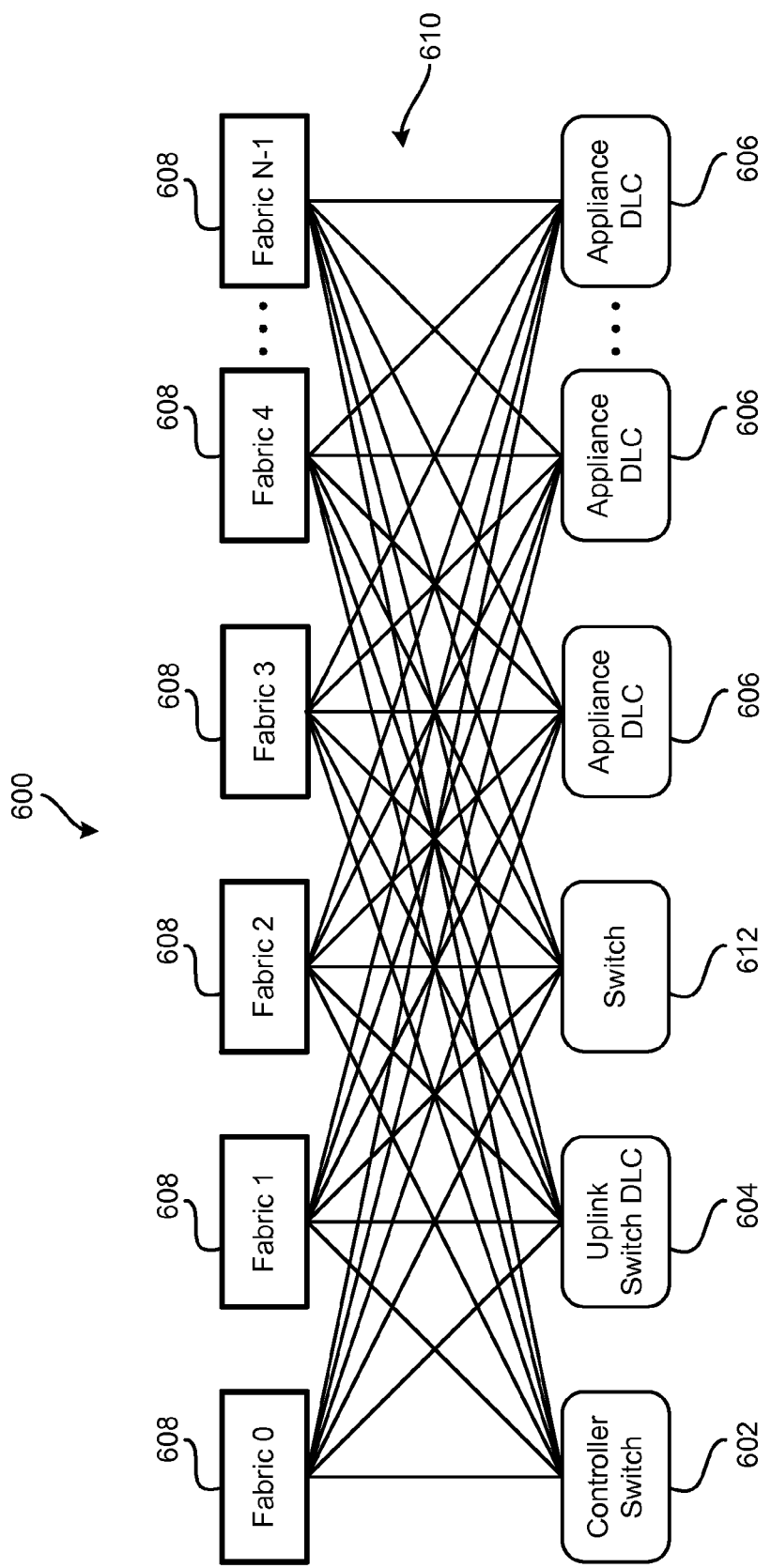
FIG. 6 shows an overview of component connectivity of an appliance cloud, according to one embodiment.

Now referring to FIG. 6, an overview of component connectivity 610 of an appliance cloud 600 is shown according to one embodiment. The controller switch 602 is a main controller of the domain of the appliance cloud 600. Because it is not necessary to have a controller switch 602 in the appliance cloud 600, according to various embodiments, no controller switch 602 may be present, there may be a controller switch 602 and no other controller may be used in the domain of the appliance cloud 600, or there may be multiple controllers in the appliance cloud 600. In alternate embodiments, one or more external servers (not shown) may be used as the other controllers, as would be known to one of skill in the art. Traffic (data/requests/alerts or the like being sent) from outside of the domain enters the appliance cloud 600 through switching DLCs or uplink Switch DLCs 604. There may be no uplink switch DLCs 604 or one or more uplink switch DLCs 604, according to various embodiments.

The controller switch 602 is responsible for determining services used for a particular traffic flow (movement of data/requests/alerts or the like through the domain) and redirects it through a series of appliances 606, as appropriate based on the particular traffic flow involved, as would be understood by one of skill in the art.

The appliance cloud 600 also includes any number (N−1) of Fabric connections 608, which may have visibility to all other components of the domain of the appliance cloud 600 through the connectivity 610, as shown in FIG. 6 in one approach. The plurality of Fabric connections 608 (as indicated by the ellipses) create one single, large, flat traffic management domain. In one embodiment, each switch in the appliance cloud 600 is a cell switch and helps create one large virtual switch by connecting all types of DLCs, including appliance DLCs, into a single cell domain. Many different types of switches may be used in the appliance cloud 600 according to various embodiments, such as conventional switches 612, controller switch 602, uplink switch DLCs 604, appliance DLCs 606, etc.

In one embodiment, the appliance cloud 600 may comprise a plurality of appliance DLCs 606, as indicated by the ellipses, with each appliance DLC 606 adapted for performing one or more services to traffic input to the appliance cloud 600.

In a further embodiment, there may be multiple appliance DLCs 606 each performing the same service (such as VPN services), along with other multiple appliance DLCs 606 performing another service (such as firewall services). When traffic is routed through the appliance cloud 600 to have services performed thereon, there may be a load-balancing function which determines which of the multiple appliance DLCs 606 performing a particular service to send the traffic to, in order to balance the processing loads of each appliance DLC 606 in the appliance cloud 600.

In various embodiments, the appliance cloud 600 may include no switches 612 or one or more switches 612, possibly of different types, for different purposes, by different manufacturers, etc., as would be understood by one of skill in the art.

In one embodiment, the topology of the appliance cloud 600, being a cell switched CLOS, provides high availability of any links/devices on the appliance cloud 600. Connectivity details and cross-sectional bandwidth may be implementation specific and best determined on an application specific basis, as would be understood by one of skill in the art.

From a networking perspective, the entire domain of the appliance cloud 600 from outside may appear like a single giant appliance, where multiple services are being applied to traffic flows. The backplane of the topology, being a cell switched interface as described before, removes the possibility of endless looping and it efficiently uses the available backplane bandwidth by spreading cells over multiple links for a single destination, according to one embodiment. Individual appliance DLCs 606 may be added/removed in the domain of the appliance cloud 600 without disrupting other services, devices, etc.

According to one embodiment, up to about 800 DLCs (of any type) may be coupled to the central Fabric formed from the multiple Fabric connections 608. This allows for about 32,768 Ethernet ports in a single domain of an appliance cloud 600, in one example. In a further embodiment, with the architecture described herein according to various embodiments, constant latency of about 2.5 microseconds or less is possible along with the large number of Ethernet ports possible in one traffic management domain. In one example, the appliance cloud 600 may be envisioned as a single giant appliance having over 32,768 smaller appliances. Here, one appliance corresponds to one Ethernet port.

According to various embodiments, the appliance DLCs 606 may comprise and/or provide any type of service or application, such as firewall services, intrusion prevention system (IPS) services, intrusion detection system (IDS) services, IPS/IDS services, server load balancing services, LAN optimization services, VPN services, video optimization services, network address translation (NAT) services, encryption services, decryption services, etc., among many other possibilities, as would be known to one of skill in the art.

Additionally, a plurality of appliance DLCs 606 may perform the same services, in one approach.

Moreover, in some approaches the services may be performed on data in the scalable virtual appliance cloud (SVAC) 600. In particular, services may be performed on data traffic, packets, cells, etc., as would be understood by one having ordinary skill in the art upon reading the present description. Further still, when a service is "performed on" a particular quantum of data, the service may be directly applied to the particular quantum of data, and additionally and/or alternatively may be performed on other data associated with the quantum of data, may be performed on other data (regardless of whether associated with the quantum of data or not) as required to enable service performance on the quantum of data, etc. as would be understood by one having ordinary skill in the art. Essentially, services being performed on a quantum of data indicates that the services are being performed in response to and/or connection with that quantum of data's request for a given service, in some approaches.

Accordingly, in addition to integrating the plurality of Ethernet ports into the appliance cloud 600, all of the requirements and advantages of a data center are also integrated into the appliance cloud 600, in some embodiments. Therefore, if a new extremely low latency, flat data center is being initiated, the appliance cloud 600 helps with virtualization, because most of the virtualized data centers, especially hypervisor-based servers, run a plurality of VMs. By having a "flat switch" architecture, the plurality of VMs may move data across the architecture easily and efficiently. It is very difficult for VMs, generally, to move across layer 3-domains, between one subnet to another subnet, internet protocol (IP) subnet to IP subnet, etc. But if the architecture is similar to a large flat switch, in a very large layer 2-domain, then the VMs are aided in their attempt to move data across the architecture.

Figure 7:
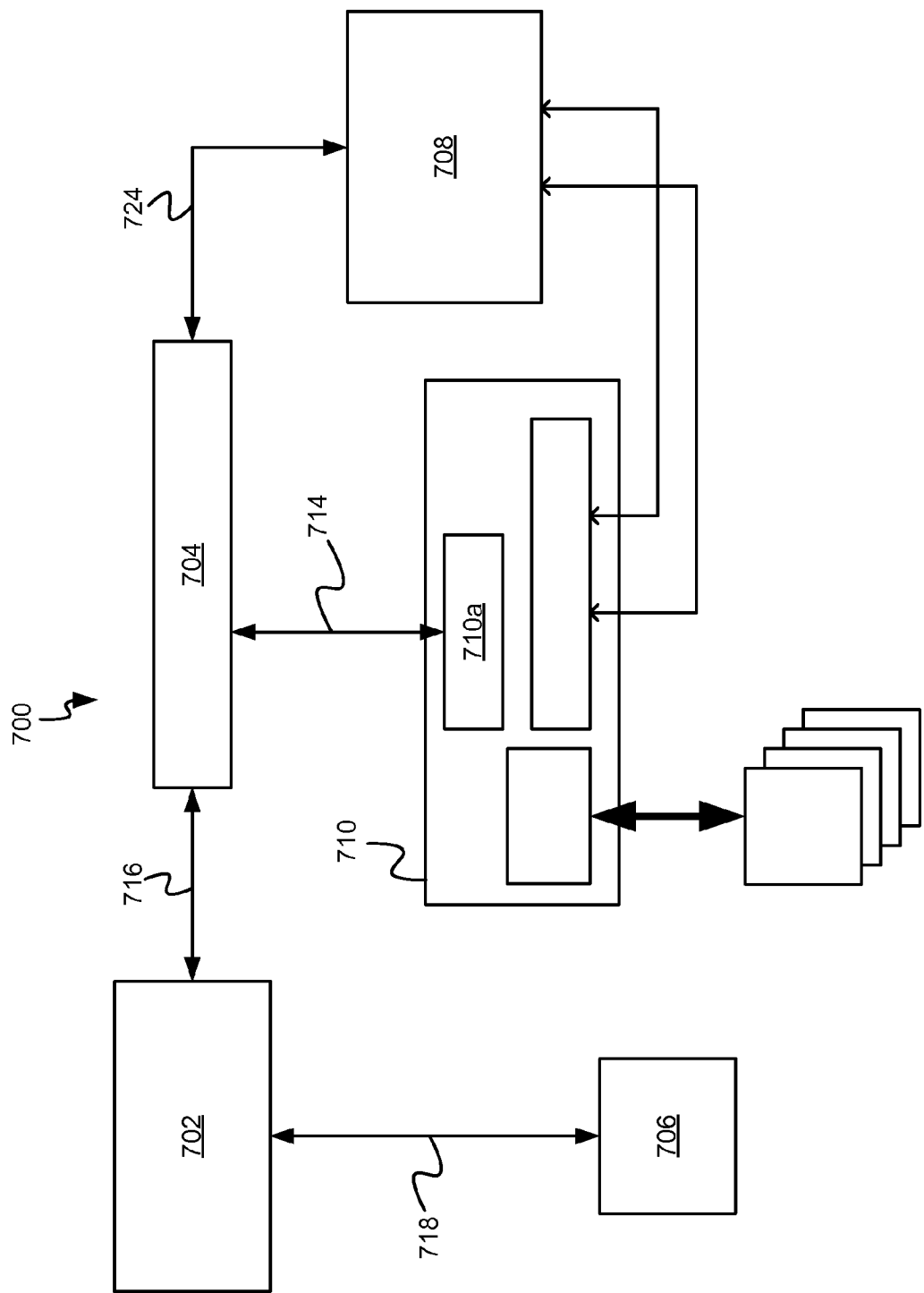
FIG. 7 depicts a distributed line card (DLC) control plane in communication with a processor complex, according to one embodiment.

Referring now to FIG. 7, a DLC control plane 700 is shown in communication with a processor complex 702, according to one embodiment. In one approach, the processor complex 702 is locally positioned with respect to the DLC control plane 700. In addition, the processor complex 702 may comprise any suitable processor or processors, such as a CPU, an application specific integrated circuit (ASIC), a microprocessor, an integrated circuit (IC), a field programmable gate array (FPGA), etc. Moreover, the processor complex 702 exchanges one or more configuration and/or status messages (cells) with the DLC control plane 700. Connections between the DLC control plane 700 and the processor complex 702 may comprise any suitable connections as would be understood by one having ordinary skill in the art, including physical connections such as Ethernet cables, internal copper wires, PCI connections, bus connections, etc., according to various embodiments. In operation, the DLC control plane 700 may run various appliance and/or application services for the SVAC, such as firewall services, IDS, IPS, and/or other VPN services, etc.

In an alternate embodiment, the processor complex 702 may be located remotely, but still be in communication with the DLC control plane 700.

Processor complex 702 is a local control processor on the DLC control plane 700 which manages all the local devices, including an I/O switch 704, Ethernet switch 710, the appliance co-processor complex 708, and other local devices on the DLC control plane 700 (which are not shown). Management Ethernet port 706 is used by the processor complex 702 to communicate out of band for various purposes, including but not limited to, telnet, file transfer, network management, etc. Communication occurs via connection 718 which may comprise copper, optical, or some other suitable link or links, and may follow standard Ethernet protocol, such as Serial Gigabit Media Independent Interface (SGMII).

According to some embodiments, the Ethernet switch 710 may be adapted for performing Ethernet packet processing functionality, traffic management, fragmenting packets into cells, and/or transmitting and receiving cells over the fabric interface. In another embodiment, the Ethernet switch 710 may include a switching ASIC, such as a BROADCOM Corporation BCM88650, or some other suitable switching processor as known in the art.

In one embodiment, the appliance co-processor complex 708 may include one or more of: a CAVIUM NETWORKS OCTEON Processor Complex, a NetLogic MICROSYSTEMS XLR processor complex, and/or a LSI LOGIC TARARI Complex, among other suitable processor complexes as known in the art.

Processor complex 702 is also connected to an I/O switch 704 which may be a PCI switch, an Infiniband switch, etc. Processor complex 702 connects to the I/O Switch 704 via link 716 which may comprise one or more (such as a pair) of PCIe bus, Infiniband bus, etc. I/O switch 704 switches I/O transactions between the processor complex 702 and the Ethernet switch 710 and the appliance co-processor complex 708 over PCIe, Infiniband, etc. The I/O switch 704 is connected to the Ethernet switch 710 via connection 714, which may be PCIe bus, among other possibilities known in the art.

In turn, according to one embodiment, the I/O switch 704 may be in communication with one or more switching devices 708, 710 via connections 714, 724. While connections 714, 724 may comprise any suitable connection type, according to various approaches, each Ethernet switch 710 or appliance co-processor complex 708 is preferentially in communication with I/O switch 704 via a PCIe bus connection.

Moreover, each connection 714 may be connected to a pair of PCIe ports 710a located on each Ethernet switch 710. In a variety of approaches, the Ethernet switch's PCIe ports 710a may be second-generation PCIe ports, in one approach. Of course in other embodiments, any suitable port, as would be understood by one skilled in the art, may be used as the PCIe ports 710a. In addition, any processor complex providing sufficient acceleration to perform application services such as firewall, IPS, IDS, VPN, encryption, etc., are suitable for use in the exemplary DLC control plane 700.

In one embodiment, a DLC may include an interface block coupled to a plurality of ports, the plurality of ports adapted for coupling to the one or more peripheral devices. Furthermore, the interface block may include logic adapted for providing direct memory access (DMA) for each lane thereof and/or switching between multiple switched ports and the plurality of ports. Furthermore, the DLC may include multiple switched ports adapted for coupling to one or more peripheral devices; switching logic adapted for switching between the multiple switched ports and a plurality of ports; a local processor coupled to the interface block. Furthermore, an external host may be coupled to at least one of the plurality of ports of the DLC, the external host comprising a pass-through adaptor and configured for performing management plane functionality and at least partially performing functionality of a control plane for a DLC.

Moreover, in one embodiment, the functionality of the management plane may include at least one of: command-line interface (CLI) over telnet operations; simple network management protocol (SNMP) agent operations; web server operations; telnet server/client operations; and/or trivial file transfer protocol (TFTP) server/client operations, among other possibilities as would be understood by one of skill in the art upon reading the present descriptions.

In another embodiment, the functionality of the control plane may include at least one of: processing control packets; running switching protocols; and running platform software, among other possibilities as would be understood by one of skill in the art upon reading the present descriptions.

In still another embodiment, the external host may be configured for programming the switching logic of the SFC to handle communications between hosts connected to the plurality of ports, hosts connected to the multiple switched ports, and/or each of a first host connected to a first port and a second host connected to a second port.

Furthermore, the external host may also and or alternatively be configured for communicating via any communications protocol that is supported by the DLC via direct memory access (DMA) in still another embodiment. Moreover, the external host may include a pass-through adaptor coupled to the DLC via a port in one particular approach.

In other embodiments, the DLC may specifically be characterized in that the plurality of ports may be peripheral component interconnect express (PCIe) ports, the interface block may be a PCIe interface block, the multiple switched ports may be multiple switched Ethernet ports, the external host may include a pass-through PCIe adaptor coupled to the DLC via a PCIe port, the peripheral devices may include one or more external PCIe devices, and the lanes of the PCIe interface block may be PCIe lanes. Of course, as would be understood by one having ordinary skill in the art upon reading the present descriptions, other DLC configurations may be utilized instead of or in combination with the above described connection types, such as FC connections, FCoE connections, etc.

In one approach, the FGPA may include logic for interfacing between the local processor and external PCIe devices; dynamically allocating memory from peripheral devices to the local processor; receiving packets from the local processor; dividing packets into cells; transmitting cells to peripheral devices via the interface block; providing a priority for cells; assembling cells into packets; dynamically allocating memory for the packets; and/or analyzing media access control (MAC) protocols.

In another embodiment, a SFC may be adapted for switching cells across a single cell switched domain, and may comprise multiple fabric ports adapted for coupling to one or more peripheral devices; switching logic adapted for switching between the multiple fabric ports and a plurality of ports; a local processor coupled to an interface block; a FPGA coupled to the local processor; logic configured for interfacing between the local processor and external PCIe devices; logic configured for dynamically allocating memory from peripheral devices to the local processor; logic configured for receiving packets from the local processor; logic configured for dividing packets into cells; logic configured for transmitting cells to peripheral devices via the interface block; logic configured for providing a priority for cells; logic configured for assembling cells into packets; logic configured for dynamically allocating memory for the packets; and logic configured for analyzing MAC protocols. Of course, one of skill in the art may envision other mechanisms for switching cells, and those may be utilized in a SFC according to various other embodiments.

In one approach, the cells may comprise at least one of configuration information and status information.

Figure 8:
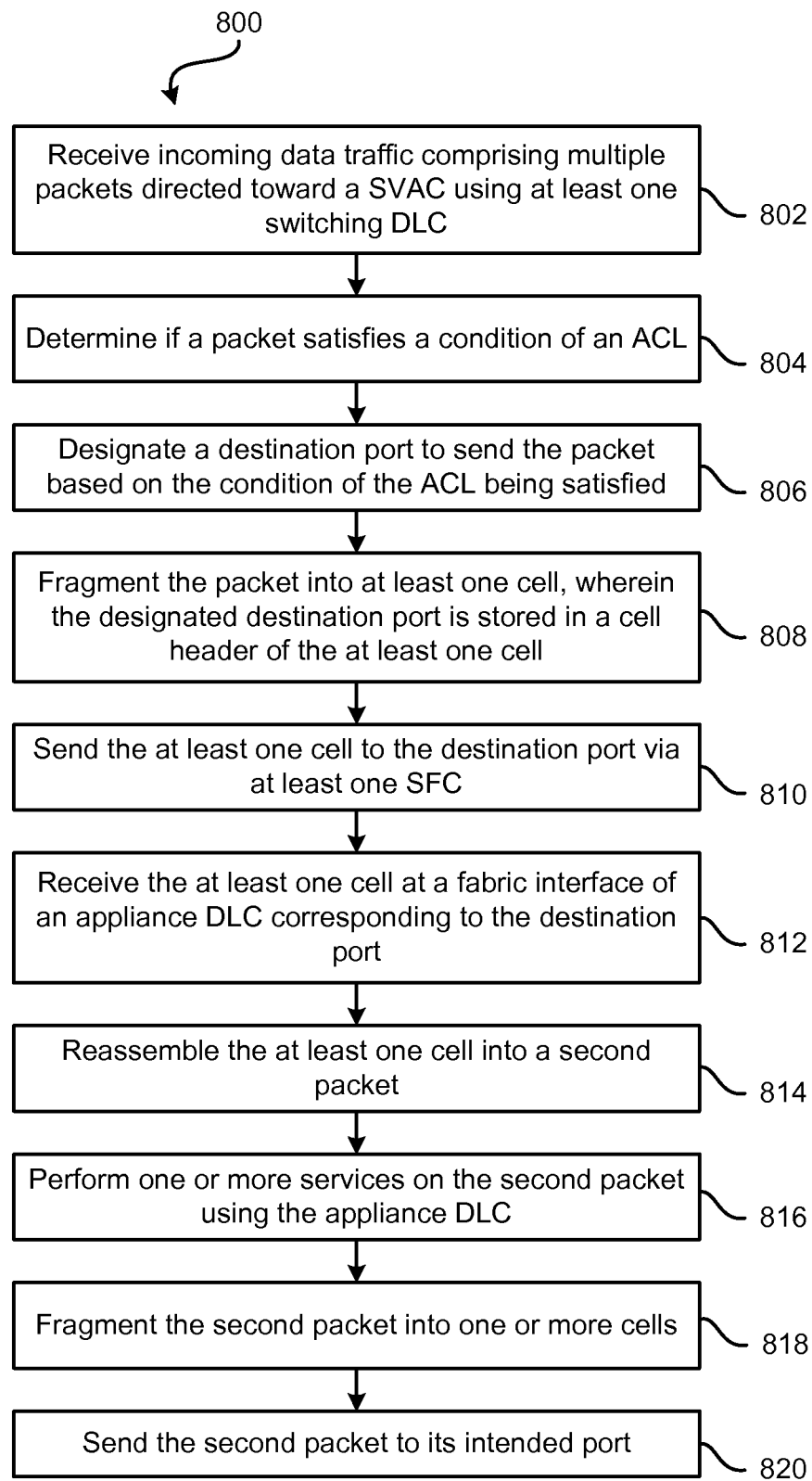
FIG. 8 is a flowchart of a method, according to one embodiment.

Now referring to FIG. 8, a flowchart of a method 800 is shown, according to one embodiment. The method 800 may be performed in accordance with the present invention in any of the environments depicted in FIGS. 1-7, and 9, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in one embodiment, the method 800 may be partially or entirely performed by either or both of a controller and/or a traffic manager, in some approaches.

As shown in FIG. 8, method 800 may initiate with operation 802, where incoming data traffic comprising multiple packets directed toward a SVAC is received using at least one switching DLC, in one approach. The incoming data traffic may arrive on a network interface of the switching DLC, such as via Ethernet or some other communication protocol.

In operation 804, it is determined if a packet satisfies a condition of an ACL. In one approach, the condition may be that the packet is directed to a particular port, is sent from a particular port, includes certain data, is a certain size, or any other condition as would be known to one of skill in the art.

In a less specific example, the incoming data traffic may be analyzed to determine one or more services to perform on the multiple packets, with the analysis possibly being performed using at least one ACL which matches a designated characteristic of data traffic flow to the incoming data traffic flow.

In one approach, the characteristic that is matched may be that the packet is directed to a particular port, sent from a particular port, a size of the packet, or any other identifiable characteristic. Of course, in more approaches, any analysis technique configured for determining any type of information may be used, as would be understood by one of skill in the art upon reading the present descriptions. Operation 804 may be performed using a processor of the switching DLC, in some approaches, such as a switching ASIC, a local CPU, etc.

Method 800 may then continue with operation 806, where a destination port to send the packet is designated based on the condition of the ACL being satisfied. For example, if the condition is met, then the packet may be directed to a particular appliance DLC to receive predetermined servicing. Operation 806 may be performed using a switching ASIC, a local CPU, etc., of the switching DLC, in some approaches.

According to one approach, each ACL may be programmed (such as by a user) such that certain traffic flows will be trapped by the ACL such that these traffic flows receive certain predetermined servicing, that servicing being provided by one or more appliance DLCs specified based on the destination port designated by the switching DLC.

In operation 808, the packet (of the incoming data traffic) is fragmented into at least one cell (and generally into multiple cells, because cells typically have a smaller size than packets). The designated destination port is stored in a cell header of the at least one cell (for multiple cells, the destination port is stored in each cell's cell header, such that each cell is directed to the destination port). Operation 808 may be performed using a switching ASIC, a local CPU, etc., of the switching DLC, in some approaches.

As shown in FIG. 8, method 800 may continue with operation 810, where the at least one cell is sent to the destination port via at least one SFC. The at least one switching DLC chooses a physical port of an appliance DLC to send the at least one cell to such that processing loads across all appliance DLCs are balanced, according to yet another approach. In further approaches, load balancing across all appliance DLCs and/or each service provider complex may be ensured when choosing a port to send the at least one cell to in order to receive services thereon. Operation 810 may be performed using a switching ASIC, a local CPU, etc., of the switching DLC, in some approaches.

In one embodiment, the physical port of the appliance DLC may be chosen from a link aggregation group (LAG) which includes multiple ports of appliance DLCs.

In operation 812, the at least one cell is received at a fabric interface of an appliance DLC corresponding to the destination port. As previously described, there may be more than one appliance DLCs which correspond to the destination port, with each appliance DLC being capable of servicing the packet in a like manner, e.g., perform the same servicing.

In operation 814, the at least one cell is reassembled into a second packet, according to one embodiment. The second packet may be identical to, or substantially the same as, the packet, at least as much is possible considering that the packet was fragmented into at least one cell for transmission across the fabric. Operation 814 may be performed using a switching ASIC of the appliance DLC, in some approaches.

In one approach, the second packet may correspond to the packet from the incoming data traffic, e.g., it may include the same information, data, etc.

In operation 816, one or more services are performed on the second packet using the appliance DLC. In another approach, other servicing devices may be used, such as other appliance DLCs and/or an appliance co-processor complex. In this approach, the appliance DLC forwards the second packet or a portion thereof via a port block of the appliance DLC to a port of one of many service processors in the appliance co-processor complex. Operation 816 may be performed using a local CPU of the appliance DLC, in some approaches.

Any service may be performed on the second packet as would be understood by one of skill in the art upon reading the present descriptions, including but not limited to those specifically described herein.

In operation 818, the second packet is fragmented into one or more cells which together constitute the second packet, as would be understood by one of skill in the art upon reading the present descriptions. Operation 818 may be performed using a switching ASIC of the appliance DLC, in some approaches.

In operation 820, the second packet is sent to its intended port after a lookup operation is performed by the switching ASIC of the appliance DLC (as originally specified in a packet header of the packet). In one embodiment, this may comprise outputting the second packet from the SVAC, for example to a network, in one approach, to a computer readable medium in another approach, to a buffer in still another approach, or to any other suitable output as would be understood by one having ordinary skill in the art upon reading the present descriptions.

In one embodiment, this may comprise fragmenting the second packet into a plurality of cells after services are provided on the second packet prior to directing the plurality of cells to the at least one switching DLC via the at least one SFC. The switching DLC may then reassemble the plurality of cells into a third packet, for directing to its intended port (which may correspond to a device on the SVAC or external to the SVAC).

In a further embodiment, the second packet may be sent back to the switching DLC via the same port on which it was sent to the appliance DLC.

In one embodiment, method 800 may further comprise automatically incorporating one or more additional appliance DLC into the SVAC upon connecting the one or more additional appliance DLC to the at least one SFC, automatically removing one or more appliance DLC from the SVAC upon disconnecting the one or more appliance DLC from the at least one SFC, increasing a processing power of the SVAC upon incorporation of the one or more additional appliance DLC, and reducing the processing power of the SVAC upon removal of the one or more appliance DLC.

Figure 9:
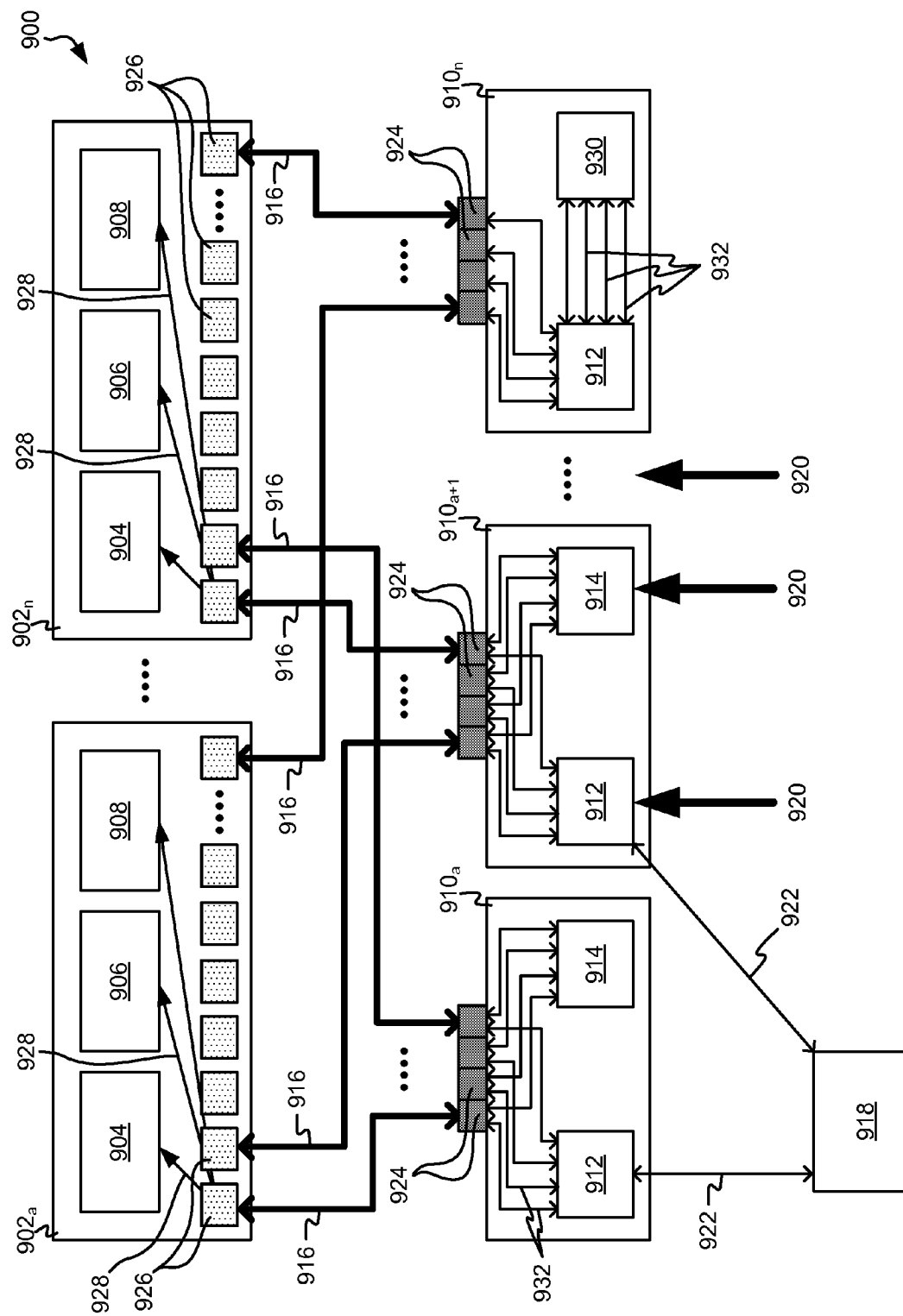
FIG. 9 shows a system having connections between controllers, according to one embodiment.

Referring now to FIG. 9, one exemplary system 900 having connections between controllers as described herein is shown according to one embodiment. The system 900 may include a plurality of switch fabric controllers (SFCs) $902_a$-$902_n$, a plurality of switching distributed line cards (DLCs) $910_a$, and a plurality of appliance DLCs $910_a$-$910_n$. The appliance cloud is formed by having a plurality of Appliance DLCs $910_a$-$910_n$ directly connected to SFCs $902_a$-$902_n$. Billions of network data packets or control protocol data units (PDUs) 920, for example PDUs from various network ports, and at least one controller 918 are received by switching DLCs $910_a$-$910_n$. According to various approaches, the SFCs $902_a$-$902_n$ may be in communication with the DLCs $910_a$-$910_n$ via a plurality of connections 916. In addition, the DLCs $910_a$-$910_n$ may be in communication with the controller 918 via a plurality of connections 922. According to various embodiments, the connections 916 may be a bundle of 12 links each with 10 G to 11 G bandwidth, in one approach. The bundle may use a standard connector form factor. The plurality of connections 922 may comprise any suitable connection, such as PCIe, gigabit Ethernet, XAUI, etc.

The controller 918 may be capable of controlling the SVAC and/or managing the processing of data thereby. In one embodiment, for example, the controller 918 may be configured with logic capable of receiving an incoming data traffic, controlling PDU traffic, and processing all the packets for the control plane of the whole cloud, except for the appliance DLCs.

In various embodiments, each SFC $902_a$-$902_n$ may be further characterized as described below. First, each SFC $902_a$-$902_n$ may include a plurality of module boards 904, 906, 908. In one embodiment, the module boards 904, 906, 908 may include any suitable module board according to the understanding of the skilled artisan reading the present descriptions. Referring again to FIG. 9, the SFCs $902_a$-$902_n$ may include a plurality of ports (or interfaces) 926 in communication with each of the module boards 904, 906, 908 via connections 928. Moreover, the ports 926 may be capable of interfacing, for example, with DLCs $910_a$-$910_n$ via connections 916. As shown in FIG. 9, each SFC $902_a$-

$902_n$ includes 32 of such ports 926, but of course other embodiments may include more or less ports for each SFC $902_a$-$902_n$, such as 8, 16, 64, 128, etc. In one particular embodiment, for example, the SFCs $902_a$-$902_n$ include 256 ports 926. In any event, each SFC/DLC includes at least n ports/interfaces, respectively, where n is the number of DLCs included in the system 900.

Additionally, the DLCs $910_a$-$910_n$ may be further characterized as follows. Each DLC (except the final DLC $910_n$ in some approaches which are described immediately below) may include a plurality of switching complexes 912, 914, in one embodiment, such as a plurality of BROADCOM Corporation BCM88650 switches. In one approach, the switching complexes may be Ethernet switching complexes. In particular, the switching complexes 912, 914 may be substantially similar to the Ethernet switch 710 described above with reference to FIG. 7, but as would be understood by the skilled artisan reading the present descriptions, other Ethernet switch complex configurations may be included in the exemplary controller connectivity system 900 as shown in FIG. 9. In addition to the switching complexes 912, 914, each DLC $910_a$-$910_n$ includes a plurality of interfaces 924 capable of facilitating communications between the DLC $910_a$-$910_n$ and any connected peripheral device or component, such as but not limited to one or more SFCs $902_a$-$902_n$, in some approaches. In one embodiment, each switching complex 912, 914 may be in communication with each of the interfaces 924 via independent connections 932. Therefore, according to one embodiment each switching complex 912, 914 may include n connections 932, one for each of the n interfaces 924 in the DLC $910_a$-$910_n$.

Further still, the final DLC in any given DLC series, denoted by DLC $910_n$, may have properties unique from the other DLCs $910_a$-$910_{n-1}$ in the series. In particular, whereas DLCs $910_a$-$910_{n-1}$ include a pair of switching complexes 912, 914, the final DLC $910_n$ may alternatively contain a single switching complex 912 in communication with each of the DLC interfaces 924 via individual connections 932 and a network processing unit (NPU) complex 930 in communication with the switching complex 912 via connections 932, according to one approach. In operation, NPU complex 930 may provide virtual appliance and/or application services, such as firewall services, IPS, IDS, VPN, encryption, etc., as would be understood by one having ordinary skill in the art upon reading the present descriptions.

In one embodiment, connections 916 may be established between interfaces 924 in the SFCs $902_a$-$902_n$ and ports 926 in the DLCs $910_a$-$910_n$. Moreover, the interfaces 924 may be SERDES interfaces, and each connection 916 may be characterized as including about 12 SERDES interfaces in DLCs $910_a$-$910_{n-1}$, whereas in DLC $910_n$ each connection 916 may be characterized as including about 6 SERDES interfaces, in one approach.

Notably, each of the SFCs $902_a$-$902_n$ is in communication with each of the DLCs $910_a$-$910_n$ via a single connection 916. Connectivity may be achieved between all SFCs and DLCs according to any connection architecture known in the art. For example, as shown in FIG. 9, connectivity between SFC ports 926 and DLC interfaces 924 is achieved according to the following relationship, $$SFC_{(S,p)} \leftrightarrow DLC_{(D,i)};$$

where S=i and p=D,
where S represents the position of the SFC in the SFC series $902_a$-$902_n$, D represents the position of the DLC in the DLC series $910_a$-$910_n$, p represents the port position within the given SFC, i represents the interface position within the given DLC, and $\leftrightarrow$ represents the connection between the two.

In other words, the first port 926 of the first SFC $902_i$ is in communication with the first interface 924 of the first DLC $910_i$ via a connection 916. Similarly, the second port 926 of the first SFC $902_i$ [SFC(1,2)] is in communication with the first interface 924 of the second DLC $910_{a+1}$ [DLC(2,1)] via a connection 916. This connectivity pattern continues until reaching the last ($n^{th}$) port 926 on the first SFC $902_a$, which is in communication with the first interface 924 of the last ($n^{th}$) DLC $910_n$. The second connection of the pair follows an inverse pattern, where the last ($n^{th}$) port 926 of the last ($n^{th}$) SFC $902_n$ is in communication with the last ($n^{th}$) interface 924 of the last ($n^{th}$) DLC $910_n$. Furthermore, the penultimate ($n-1^{th}$) port 926 of the last ($n^{th}$) SFC $902_n$ is in communication with the last ($n^{th}$) interface 924 of the penultimate DLC $910_{n-1}$. This connectivity pattern continues until reaching the last ($n^{th}$) port 926 of the first SFC $902_a$, which is in communication with the first ($a^{th}$) interface 924 of the last DLC $910_n$.

Furthermore, in various embodiments the controller 918 may be a virtual machine (VM) located on a network server, or any suitable controller may be employed, as would be understood by those of ordinary skill in the art upon reading the present descriptions.

Moreover, the system 900 shown in FIG. 9 includes a plurality of SFCs $902_a$-$902_n$ and a plurality of DLCs $910_a$-$910_n$; specifically, the system 900 depicts two SFCs and three DLCs. However, as one feature of the system 900 for use in a SVAC, the number of SFCs, switching DLCs, and appliance DLCs included in the system 900 may be scaled to achieve virtual appliance cloud performance characteristics, as particularly desired. In FIG. 9, scalable features include the number of SFCs and the number of DLCs, as well as the number of ports (or interfaces) included on each SFC and/or DLC, as indicated by the ellipsis shown in FIG. 9.

In one approach, the system 900 is capable of seamless scaling out to adjust system capabilities to meet processing needs. In particular, the system may be configured to automatically incorporate one or more additional peripheral devices into the scalable virtual appliance cloud upon connecting the one or more additional peripheral devices to a device of the scalable virtual appliance cloud, and further configured to remove one or more peripheral devices from the scalable virtual appliance cloud upon disconnecting the one or more peripheral devices from a device of the scalable virtual appliance cloud.

Seamless scalability may thus be achieved in some approaches by automatically increasing the processing power of the scalable virtual appliance cloud upon incorporation of the one or more additional peripheral devices, or conversely by automatically reducing the processing power of the scalable virtual appliance cloud upon the removal of the one or more peripheral devices, in one embodiment.

In one embodiment, a system 900 comprises a SVAC that includes at least one DLC $910_a$-$910_n$, at least one SFC $902_a$-$902_n$ in communication with the at least one DLC, and at least one controller 918 in communication with the at least one DLC. One or more of the at least one DLC is an appliance DLC, one or more of the at least one SFC is a central SFC, and the SVAC appears to a device external of the SVAC as a single appliance device applying various services to a traffic flow.

In some further embodiments, the one or more appliance DLC may be adapted to be removed from or added to the SVAC without interrupting operation of the SVAC, all of the at least one DLC may be connected to the at least one central SFC to form a single large cell switched domain, one or more of the at least one DLC may be a switching DLC, the one or more appliance DLC and the one or more switching DLC are connected to the at least one central SFC, and/or the one or more appliance DLC is adapted to provide various deep packet inspection services to all packets received on the one or more switching DLC.

In more embodiments, the one or more switching DLC may be adapted for applying ACLs on each switching interface to direct certain received packets to the one or more appliance DLC for performing the deep packet inspection services, the one or more appliance DLC may be adapted to be removed from or added to the SVAC without interrupting the deep packet inspection services which is achieved by having the one or more switching DLC performing load balancing on all packets having deep packet inspection services performed thereon between all the one or more appliance DLC, and/or removal or addition of an appliance DLC or a switching DLC from the SVAC may be (preferably immediately) indicated to remaining appliance DLCs and switching DLCs, removal of one or more appliance DLC from the SVAC may be indicated to each switching DLC, with each switching DLC, in response to the indication of the removal of one or more appliance DLC being adapted to stop forwarding packets to one or more ports associated with the removed appliance DLC and to load balance packets having deep packet inspection services performed thereon between remaining appliance DLCs. Also, in some approaches, addition of one or more appliance DLC may be indicated to each switching DLC, with each switching DLC, in response to the indication of addition of one or more appliance DLC, being adapted to load balance packets having deep packet inspection services performed thereon across all appliance DLCs including the one or more additional appliance DLC, and/or a type of packet having deep packet inspection services performed thereon may be changed by specifying different types of ACLs on the one or more switching DLC. The ACLs may be used to trap certain traffic flows that require similar services to be performed thereon, and then designate destination ports to which the traffic flow may be sent to receive the similar services (which may include one or more appliance DLCs in the routing).

In more approaches, each of the one or more appliance DLC may be adapted to provide various deep packet inspection services, including: firewall services, intrusion prevention services (IPS), intrusion detection services (IDS), server load balancing services, virtual private network (VPN) services, video optimization services, and/or wide area network (WAN) optimization services.

In some embodiments, the at least one controller may be in communication with the at least one SFC, and/or the at least one DLC may be in communication with at least one peripheral device. Furthermore, the at least one controller may communicate configuration information and status information to at least one of: a DLC and a SFC.

In additional approaches, the SVAC may be configured to automatically incorporate one or more additional appliance DLC into the system upon connecting the one or more additional appliance DLC to the one or more SFC and automatically remove one or more DLC from the system upon disconnecting the one or more DLC from the one or more SFC. Also, in one embodiment, incorporating one or more additional appliance DLC into the SVAC may increase a processing power available to the SVAC, and removing the one or more additional appliance DLC from the SVAC may reduce the processing power available to the SVAC.

Figure 10:
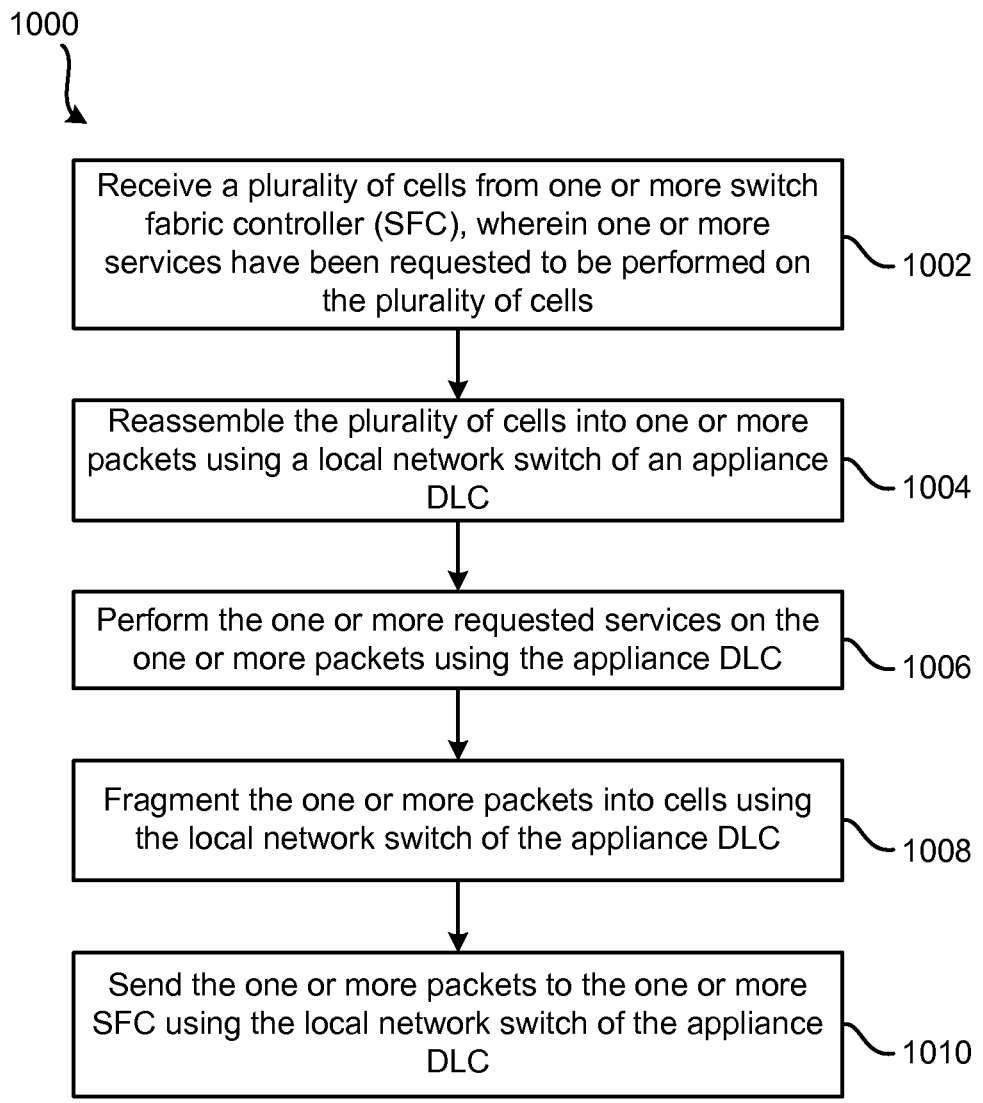
FIG. 10 is a flowchart of a method, according to one embodiment.

Now referring to FIG. 10, a flowchart of a method 1000 is shown, according to one embodiment. The method 1000 may be performed in accordance with the present invention in any of the environments depicted in FIGS. 1-7, and 9, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in one embodiment, the method 1000 may be partially or entirely performed by an appliance DLC.

As shown in FIG. 10, method 1000 may initiate with operation 1002, where a plurality of cells are received from one or more SFC, wherein one or more services have been requested to be performed on the plurality of cells, in one approach.

In operation 1004, the plurality of cells are reassembled into one or more packets using a local network switch of an appliance DLC.

In operation 1006, the one or more requested services are performed on the one or more packets using the appliance DLC.

In operation 1008, the one or more packets are fragmented into cells using the local network switch of the appliance DLC or some other suitable device.

In operation 1010, the one or more packets are sent to the one or more SFC using the local network switch of the appliance DLC.

Figure 11:
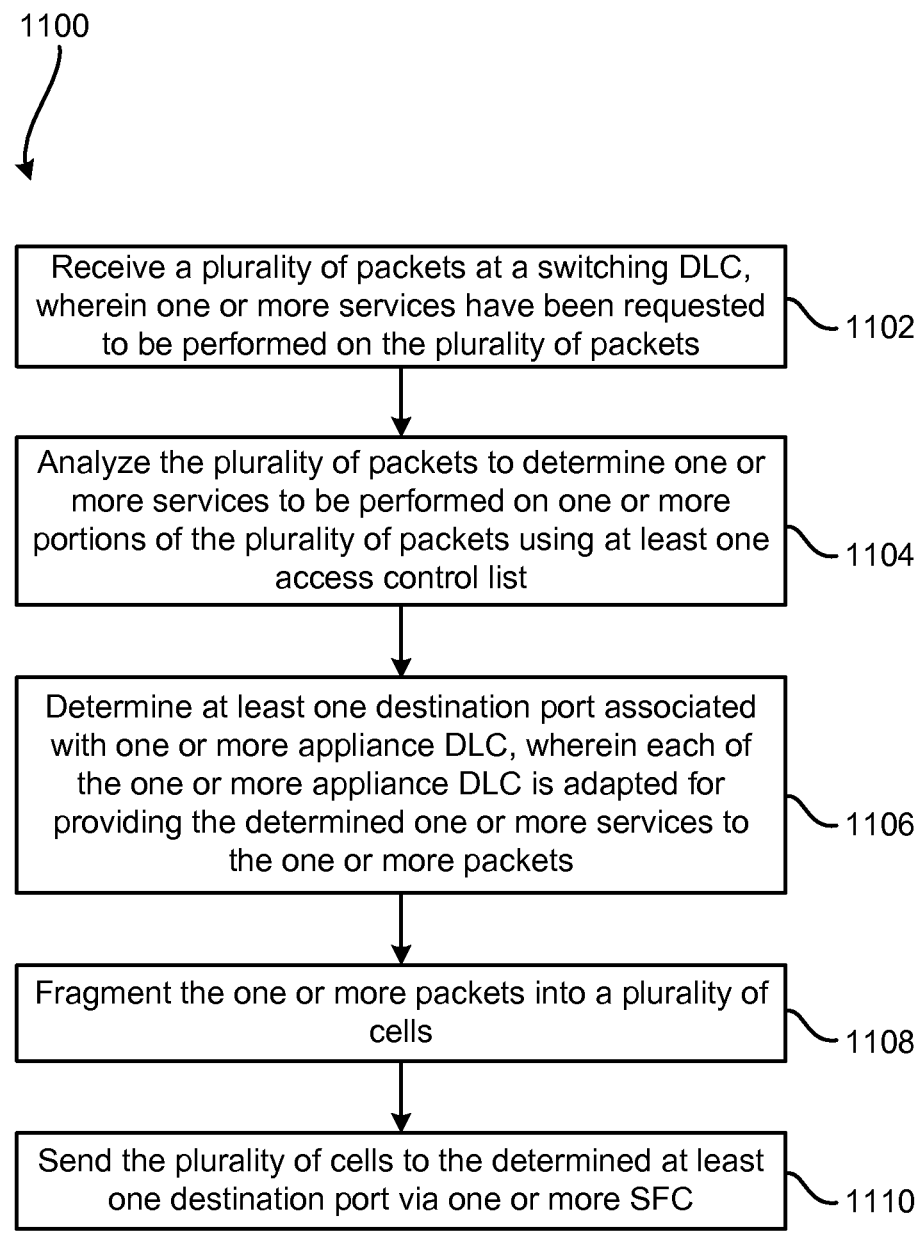
FIG. 11 is a flowchart of a method, according to one embodiment.

Now referring to FIG. 11, a flowchart of a method 1100 for providing SVAC services is shown, according to one embodiment. The method 1100 may be performed in accordance with the present invention in any of the environments depicted in FIGS. 1-7, and 9, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in one embodiment, the method 1100 may be partially or entirely performed by a switching DLC.

As shown in FIG. 11, method 1100 may initiate with operation 1102, where a plurality of packets are received at a switching DLC. One or more services have been requested to be performed on the plurality of packets, in one approach.

In operation 1104, the plurality of packets are analyzed to determine one or more services to be performed on one or more portions of the plurality of packets using at least one ACL. The ACL traps multiple portions of the incoming traffic flow based on a difference between a service or services to perform on the multiple portions. Of course, in more approaches, any analysis technique configured for determining any type of information may be used, as would be understood by one of skill in the art upon reading the present descriptions.

In operation 1106, at least one destination port associated with one or more appliance DLC is determined, wherein each of the one or more appliance DLC is adapted for providing the determined one or more services to the one or more packets. In addition, at least one destination port of an appliance DLC is determined for each of the cells based on the one or more services to perform.

According to one embodiment, a condition may exist where a packet switching block of the appliance DLC (which may be in the local network switch) does not learn source or destination addresses from packets received from a local processor of the appliance DLC.

In operation 1108, the one or more packets is fragmented into a plurality of cells. Which destination port to send the cells to is determined such that processing loads of each appliance DLC are balanced, according to yet another approach.

In operation 1110, the plurality of cells are sent to the determined at least one destination port via one or more SFC. Operation 1110 may be performed using network switches of one or more switching DLC, in some approaches.

According to various embodiments, the analyzing the plurality of packets may be performed using a switching DLC, each ACL may trap one or more packets based on services to be performed on the one or more packets, each ACL may balance processing loads of the one or more appliance DLC to which the ACL sends packets for performing services thereon, a local network switch of the switching DLC may fragment the one or more packets into the plurality of cells, and/or the determining the at least one destination port may comprise determining which appliance DLCs are adapted for providing the one or more determined services.

The SVAC provides several advantages over conventional techniques and systems for providing virtual services. In particular, one advantage that it provides is low cost of implementation and operation, because this approach employs smaller devices instead of large, expensive ones common to conventional systems.

Moreover, the SVAC infrastructure provides flexibility via a "pay as you go" approach, where as network requirements are presented, more appliances may be added to address the requirements. Similarly, where network requirements are removed or relaxed appliances may be removed and/or used for other tasks. Accordingly, there is only a minimal cost burden on system administration, because instead of investing heavily on appliances, one may simply keep on adding appliances as are required.

Moreover, the presently described SVAC system, according to various embodiments, provides flexibility regarding which services may be provided. While many conventional approaches provide a single service, e.g., in firewall boxes, or IDS boxes or IPS boxes, etc., as would be understood by the skilled artisan, the presently described systems may provide any and/or all services desired by a particular individual or user.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   at least one switching distributed line card (DLC) configured to:
      apply Access Control Lists (ACLs) on each switching interface of the at least one switching DLC to direct certain packets received by the at least one switching DLC to at least one appliance DLC to have deep packet inspection services performed on the certain packets in response to a determination that a designated characteristic of data traffic flow designated by at least one ACL matches a characteristic of the certain packets; and
      send the certain packets to an intended destination after one or more deep packet inspection services have been performed on the certain packets using the at least one appliance DLC; and
   at least one central switch fabric coupler (SFC) in communication with the at least one switching DLC,
   wherein the at least one appliance DLC and the at least one switching DLC are coupled to the at least one central SFC.

2. The system as recited in claim 1, wherein the at least one appliance DLC is configured to be removed from or added to the system without interrupting operation of the system.

3. The system as recited in claim 2, wherein the at least one appliance DLC is further configured to perform load balancing on all packets having deep packet inspection services performed thereon between all of the at least one appliance DLC, wherein adding one or more additional appliance DLC to the system increases a processing power available to the system, and wherein removing one or more appliance DLCs from the system reduces the processing power available to the system.

4. The system as recited in claim 1, wherein all of the at least one switching DLC and all of the at least one appliance DLC are connected to the at least one central SFC to form a single large cell switched domain.

5. The system as recited in claim 1, wherein the system appears to a device external to the system as a single appliance device applying various deep packet inspection services to a traffic flow.

6. The system as recited in claim 1, wherein the ACLs are configured to trap certain traffic flows to perform similar deep packet inspection services thereon and to designate destination ports to which the certain traffic flows are sent to receive the similar deep packet inspection services.

7. The system as recited in claim 1, wherein removal or addition of an appliance DLC or a switching DLC from the system is indicated to remaining appliance DLCs and switching DLCs in the system.

8. The system as recited in claim 7, wherein removal of one or more appliance DLC from the system is indicated to each switching DLC, and wherein each switching DLC is configured to, in response to the indication of the removal of the one or more appliance DLC, stop forwarding packets to one or more ports associated with the removed appliance DLC and to load balance packets having deep packet inspection services performed thereon between remaining appliance DLCs.

9. The system as recited in claim 7, wherein addition of one or more appliance DLC to the system is indicated to each switching DLC, wherein each switching DLC is configured to, in response to receiving indication of addition of the one or more appliance DLC, load balance packets having deep packet inspection services performed thereon across all appliance DLCs including the one or more additional appliance DLC.

10. The system as recited in claim 1, wherein a type of packet having deep packet inspection services performed thereon is changed by specifying different types of ACLs on the at least one switching DLC.

11. The system as recited in claim 1, wherein the deep packet inspection services include:
   firewall services;
   intrusion prevention services (IPS);

intrusion detection services (IDS);
server load balancing services;
virtual private network (VPN) services;
video optimization services; and
wide area network (WAN) optimization services.

12. A method comprising:
receiving incoming data traffic comprising multiple packets directed toward a scalable virtual appliance cloud (SVAC) using at least one switching distributed line card (DLC);
applying Access Control Lists (ACLs) on each switching interface of the at least one switching DLC to direct certain packets to at least one appliance DLC to have deep packet inspection services performed on the certain packets in response to a determination that a designated characteristic of data traffic flow designated by at least one ACL matches a characteristic of the certain packets;
performing one or more deep packet inspection services on the certain packets using the at least one appliance DLC; and
sending, by the at least one switching DLC, the certain packets to an intended destination after one or more deep packet inspection services have been performed on the certain packets using the at least one appliance DLC.

13. The method as recited in claim 12, wherein the at least one appliance DLC is configured to be removed from or added to the SVAC without interrupting operation of the SVAC.

14. The method as recited in claim 12, further comprising connecting all of the at least one switching DLC and all of the at least one appliance DLC to at least one central switch fabric controller (SFC) to form a single large cell switched domain.

15. The method as recited in claim 12, wherein the SVAC appears to a device external to the SVAC as a single appliance device applying various deep packet inspection services to a traffic flow.

16. The method as recited in claim 12, wherein the ACLs are configured to trap certain traffic flows to perform similar deep packet inspection services thereon and to designate destination ports to which the certain traffic flows are sent to receive the similar deep packet inspection services.

17. The method as recited in claim 12, further comprising removing or adding one or more appliance DLCs without interrupting the deep packet inspection services by performing load balancing, using the at least one switching DLC, on all packets having deep packet inspection services performed thereon between all of the at least one appliance DLC, wherein adding one or more additional appliance DLCs to the SVAC increases a processing power available to the SVAC, and wherein removing one or more appliance DLCs from the SVAC reduces the processing power available to the SVAC.

18. The method as recited in claim 12, further comprising indicating removal or addition of an appliance DLC or a switching DLC to all remaining appliance DLCs and switching DLCs in the SVAC.

19. The method as recited in claim 12, further comprising changing a type of packet having deep packet inspection services performed thereon by specifying different types of ACLs to be applied by the at least one switching DLC.

20. A computer program product comprising a computer readable storage device having program instructions embodied therewith, the embodied program instructions executable by a switching distributed line card (DLC) to cause the switching DLC to:
receive, by the switching DLC, incoming data traffic comprising multiple packets directed toward a scalable virtual appliance cloud (SVAC);
apply, by the switching DLC, Access Control Lists (ACLs) on each switching interface of the switching DLC to direct certain packets to at least one appliance DLC to have deep packet inspection services performed on the certain packets, wherein the ACLs are configured to trap certain traffic flows to perform similar deep packet inspection services thereon in response to a determination that a designated characteristic of data traffic flow designated by at least one ACL matches a characteristic of the certain traffic flows and to designate destination ports to which the certain traffic flows are sent to receive the similar deep packet inspection services; and
send, by the switching DLC, the certain packets to an intended destination after one or more deep packet inspection services have been performed on the certain packets using the appliance DLC.

21. The computer program product as recited in claim 20, wherein the embodied program instructions further comprise program instructions executable by the switching DLC to cause the switching DLC to connect all switching DLCs and all appliance DLCs to at least one central switch fabric controller (SFC) to form a single large cell switched domain.

22. The computer program product as recited in claim 20, wherein the SVAC appears to a device external to the SVAC as a single appliance device applying various deep packet inspection services to a traffic flow.

23. The computer program product as recited in claim 20, wherein the embodied program instructions further comprise program instructions executable by the switching DLC to cause the switching DLC to perform load balancing on all packets having deep packet inspection services performed thereon between all of appliance DLCs, wherein adding one or more additional appliance DLCs to the SVAC increases a processing power available to the SVAC, and wherein removing one or more appliance DLCs from the SVAC reduces the processing power available to the SVAC.

24. The computer program product as recited in claim 20, wherein the embodied program instructions further comprise program instructions executable by the switching DLC to cause the switching DLC to indicate removal or addition of an appliance DLC or a switching DLC to all remaining appliance DLCs and switching DLCs in the SVAC.

25. The computer program product as recited in claim 20, wherein the embodied program instructions further comprise program instructions executable by the switching DLC to cause the switching DLC to change a type of packet having deep packet inspection services performed thereon by specifying different types of ACLs to be applied on packets received by the switching DLC.

* * * * *